United States Patent Office 2,784,162
Patented Mar. 5, 1957

2,784,162

REFORMING CATALYSTS OF ALUMINA, MOLYBDENUM OXIDE, FLUORINE, AND ONE OR BOTH OF TITANIA AND IRON OXIDE, AND METHOD FOR MAKING SAME

John W. Myers and Lloyd C. Mabry, Jr., Bartlesville, Okla., assignors to Phillips Petroleum Company, a corporation of Delaware No Drawing. Application December 23, 1952,
Serial No. 327,678

14 Claims. (Cl. 252—466)

This invention relates to an improvement in the art of manufacturing fuels. In one aspect this invention relates to a process wherein a low octane number naphtha is upgraded to produce higher octane motor fuels. In another aspect this invention relates to new reforming catalysts. In still another aspect this invention relates to the preparation of new reforming catalysts.

In the catalytic reforming of hydrocarbons low octane number petroleum fractions, e. g., straight run and cracked naphthas are converted into higher octane number fuels in the presence of hydrogen at temperatures such as in the range of 700–1150° F., at a pressure of from atmospheric to about 1000 p. s. i. a. with an hourly liquid space velocity of from about 0.1 to 5.0 with hydrogen dilution of from 500 to 5000 cubic feet per barrel of naphtha feed and for process periods of from about 4 hours to continuous operation.

Catalysts used in reforming processes are selected from a wide variety of different materials, particularly oxides or sulfides of groups IV, V, VI, and VIII of the periodic system. In the co-pending application of James R. Owen, Serial No. 262,200, filed December 18, 1951, now abandoned, is disclosed a class of improved reforming catalysts consisting of molybdena, alumina and fluorine. As disclosed in the said co-pending application, there is a critical relationship between the octane number of the reformate obtained in the presence of that catalyst and the amount of fluorine in the hydrogen fluoride employed in the activation of the said catalyst, i. e., the amount of HF relative to the alumina content of the catalyst, providing for superior results in octane number of the reformate obtained.

We have discovered that such a molybdena-alumina-fluoride catalyst as that obtained above, when incorporated with titania and/or iron oxide and employed as reforming catalyst, provides for still greater improvement in octane number of the reformate. The molybdena-alumina-fluorine-titania and/or iron oxide catalysts are novel catalysts of this invention.

In accordance with our invention we have provided a process for reforming hydrocarbons such as those boiling in the motor fuel range to form a hydrocarbon product having improved anti-knock characteristics, which comprises passing the hydrocarbon feed in contact with an alumina-fluorine-molybdena catalyst with which has been incorporated from 0.1 to 10 weight percent titania and/or from 0.1 to 10 weight percent iron oxide, and prepared for example as described hereinafter, in the presence of from 500 to 4000 cubic feet of hydrogen per barrel of feed at a temperature of from 700–1150° F. and a pressure of from atmospheric to 1000 p. s. i. a. and at an hourly liquid space velocity of from 0.1 to 5.0, and for reforming catalysts of the type described immediately hereinabove as new compositions and a method for their preparation.

One method for the preparation of the reforming catalysts of this invention involves the steps of treating a wet alumina gel with aqueous hydrofluoric acid and mixing the thus treated gel with titania and/or iron oxide and adding aqueous ammonium molybdate to the catalyst preparation mixture, after which the catalyst mixture is agitated and the catalyst is then isolated, dried and calcined. Although various forms of natural alumina may be used as a supporting material in the preparation of the catalysts of this invention, the preferred form of alumina is a substantially pure synthetic gel or gelatinous product. Preferably the gel is prepared by reacting aqueous aluminum nitrate or aluminum sulfate with aqueous ammonia. The precipitate so formed may be washed free of the reaction products by several applications of wash water; however, it may not always be desirable to wash the precipitate, particularly when aluminum nitrate is used. When washing the precipitate, it is preferable to use four applications, each application being equivalent to three volumes of the settled gel. All the excess water is then removed from the gelatinous precipitate and the resulting moist cake is activated by the addition of aqueous hydrofluoric acid which contains an amount of fluorine of from 0.05 to 1.0 percent, and preferably about 0.3 to 0.6 percent by weight based on the total alumina content of the catalyst. The aqueous hydrofluoric acid should be of such concentration that the carrier can be uniformly contacted therewith. Ordinarily, a solution containing from 1–6 percent of aqueous hydrofluoric acid will be sufficient to uniformly wet the carrier. Titania and/or iron oxide can be added to the HF-activated carrier prior to, during, or after the impregnation of same with ammonium molybdate. The titania and/or iron oxide to be added to the said activated carrier can be prepared by the addition of aqueous ammonium hydroxide to an aqueous solution of titanium nitrate and/or ferric nitrate and water washing the itania and/or iron oxide. The washed oxide or oxide mixture is added to the HF-activated carrier as described above in any desired manner, conveniently by mechanically admixing the oxide or oxides therewith. This invention is illustrated by way of the following examples.

The catalysts of this invention prepared in accordance with the foregoing procedure, have a fluorine content determined by the fluorine content of the aqueous HF employed in the HF-activation step described above, a molybdena content of from 2–25 weight percent and a titania and/or iron oxide content each of 0.1 to 10 weight percent, the remainder being alumina. Preferred catalysts contain from 5–20 weight percent molybdena and from 0.5–7 weight percent each of titania and/or iron oxide.

Although we have disclosed alumina-molybdena-fluorine-iron oxide and/or titanium oxide catalysts and their preparation in accordance with a preferred preparative procedure, it is to be understood that all alumina-molybdena-fluorine-iron oxide and/or titanium oxide catalysts, containing on a weight basis 2–25 percent molybdena, not more than about 1 percent fluorine, 0.1 to 10 percent iron oxide and/or 0.1 to 10 percent titanium oxide and the remaining alumina, are within the scope of our invention, and that any other method may be used in the preparation of these catalysts, although the method described hereinabove is preferred.

In the preparation of the catalysts of this invention, molybdena, iron oxide and/or titanium oxide components can be incorporated with the catalyst during its preparation in the form of a compound decomposable to that oxide and decomposing the said decomposable compound to the oxide by heating during subsequent catalyst preparation steps. Iron nitrate, titanium nitrate, ammonium molybdate, iron acetate, ammonium iron oxalate, iron oxalate, iron benzoate, and iron carbonate are exemplary of these decomposable compounds.

*Example I*

An alumina-molybdena-fluorine catalyst, referred to hereinafter as catalyst A, was prepared as follows. Alumina gel was prepared by adding aqueous ammonium hydroxide to aqueous aluminum nitrate solution. The gel was thoroughly washed. The washing consisted of four washes with distilled water containing a small amount of ammonium hydroxide and a final wash with distilled water. Sufficient aqueous hydrogen fluoride solution (5 weight percent) was added to the wet alumina gel to give a finished catalyst containing 0.5 weight percent fluorine and the mixture was thoroughly agitated. Aqueous ammonium molybdate solution was then added to the mixture in an amount to give a finished catalyst containing 10 weight percent molybdena, and the mixture was thoroughly stirred. The mixture was then dried at 230° F. and calcined at 680–730° F. The calcined catalyst (catalyst A) was then pilled.

An alumina-molybdena-fluorine-titania-iron oxide catalyst, referred to hereinafter as catalyst B, was prepared as follows. Alumina gel was prepared by adding aqueous ammonium hydroxide to aqueous aluminum nitrate solution. The gel was washed in the same manner as in the preparation of catalyst A above, and also treated with aqueous hydrogen fluoride in the same manner. Aqueous ammonium hydroxide solution was added to an aqueous solution of titanium nitrate and ferric nitrate. The titania and iron oxide thus formed were thoroughly washed. The washing consisted of three washes with distilled water containing a small amount of ammonium hydroxide and a final wash with distilled water. The washed titania-iron oxide mixture was then added to the hydrogen fluoride alumina mixture in the proper proportion to give a finished catalyst containing 2 weight percent iron oxide and 3 percent titania and the mixture was thoroughly stirred. Aqueous ammonium molybdate was then added to the mixture in an amount to give a finished catalyst containing 10 weight percent molybdena, and the mixture was thoroughly stirred. The mixture was then dried at 230° F. and calcined at 750° F. The calcined catalyst (catalyst B) was then pilled.

*Example II*

A naphtha having an ASTM boiling range of from 247–472° F., API gravity of 51.0° and a clear motor octane number of about 27.5 was reformed by passing it together with about 2600 cubic feet of hydrogen per barrel of feed, in two runs in contact with a fixed granular bed of catalyst A of Example I, consisting of, on a weight basis, 10 percent molybdena, 0.5 percent fluorine, and 89.5 percent alumina. These runs were each 6 hours long and were made at pressure of 245 p. s. i. a. and an original liquid space velocity of one.

These two runs were repeated except that the catalyst employed was catalyst B of Example I, consisting on a weight basis of 10 percent molybdena, 0.5 percent fluorine, 84.5 percent alumina, 2 percent ferric oxide, and 3 percent titania.

Octane-yield data obtained from making these runs are tabulated as follows:

| Product | $C_5$+ Reformate | 10# RVP Gasoline |
|---|---|---|
| Octane number, clear (motor): | | |
| 82 percent yield— | | |
| Catalysts: | | |
| Molybdena-alumina-fluorine, Catalyst A | 67.9 | |
| Molybdena-alumina-fluorine-titania-iron oxide (Catalyst B) | 71.4 | |
| Net increase in octane number | 3.5 | |
| 85 percent yield— | | |
| Catalysts: | | |
| Molybdena-alumina-fluorine, Catalyst A | 62.8 | |
| Molybdena-alumina-fluorine-titania-iron oxide (Catalyst B) | 64.8 | |
| Net increase in octane number | 2.0 | |
| 91 percent yield— | | |
| Catalysts: | | |
| Molybdena-alumina-fluorine, Catalyst A | | 69.3 |
| Molybdena-alumina-fluorine-titania-iron oxide (Catalyst B) | | 74.2 |
| Net increase in octane number | | 4.9 |
| 94 percent yield— | | |
| Catalysts: | | |
| Molybdena-alumina-fluorine, Catalyst A | | 66.7 |
| Molybdena-alumina-fluorine-titania-iron oxide (Catalyst B) | | 69.6 |
| Net increase in octane number | | 2.9 |

As set forth in the tabulation, when operating at 82 percent yield level, a net increase of 3.5 in octane number of $C_5$+ reformate is obtained; when employing a catalyst of this invention in place of a molybdena-alumina-fluorine catalyst; similarly a net increase in $C_5$+ reformate octane number at 85 percent yield level is 2.0. Such a net increase of octane number of 10 pound Reid vapor pressure gasoline product at 91 percent level is 4.9; and at 94 percent yield level, the octance number increase is 2.9.

As demonstrated in the foregoing tabulation when reforming the same naphtha feed stock under identical reforming conditions, except for catalyst, a significant increase in octane number is obtained when titania and iron oxide are present in the molybdena-alumina-fluorine catalyst over that obtained when reforming in the presence of catalyst containing molybdena-alumina-fluorine alone.

Variation and modification are possible within the scope of the foregoing disclosure and the appended claims to the invention, the essence of which is a class of new catalysts consisting essentially of alumina, molybdena, fluorine, titania and/or iron oxide, a method for their preparation and for reforming hydrocarbon stocks in the presence of these catalysts to provide reformate of improved quality, particularly with respect to octane number.

We claim:

1. A reforming catalyst consisting essentially of alumina in a proportion defined hereinafter, from 2–25 weight percent molybdenum oxide, not more than 1 weight percent fluorine, at least one metal oxide selected from the group consisting of titania and iron oxide, each said metal oxide being present in a proportion of from 0.1 to 10 weight percent, and said alumina constituting the remaining proportion.

2. A catalyst of claim 1, wherein the proportion of said molybdenum oxide is within the range of 5–20 weight percent and the proportion of each said metal oxide present is within the range of 0.5–7 weight percent.

3. A reforming catalyst of claim 1 wherein said alumina is a alumina gel.

4. A reforming catalyst of claim 1 wherein both titania and iron oxide are present.

5. A reforming catalyst of claim 1 wherein the amount of fluorine in said aqueous hydrogen fluoride is from 0.3 to 0.5 weight percent.

6. A process for the preparation of a reforming catalyst comprising contacting an alumina carrier with aqueous hydrogen fluoride containing from 0.05 to 1.0 weight percent fluorine based on the total alumina content of said carrier, whereby the said carrier is HF activated, subsequently admixing with the HF-activated carrier at least one metal oxide selected from the group consisting of titania and iron oxide in a amount of from 0.1 to 10 weight percent of each metal oxide based on the finished catalyst and also impregnating the HF-activated carrier with a decomposable molybdenum compound to provide from 2 to 25 weight percent molybdena in the finished catalyst, and recovering finished catalyst as product of the process.

7. A process for the preparation of a reforming catalyst comprising activating a substantially pure alumina gel by uniformly contacting same with aqueous hydrogen fluoride containing hydrogen fluoride in a concentration of from 1 to 6 weight percent and in an amount which contains from 0.05 to 1.0 percent fluorine based on the total alumina content of said carrier, partially drying the activated gel and then admixing same with a least one metal oxide selected from the group consisting of titania and iron oxide in an amount of from 0.1 to 10 weight percent of each metal oxide based on the finished catalyst and also impregnating the HF-activated gel with ammonium molybdate solution to provide from 2 to 25 weight percent molybdena in the finished catalyst, and recovering finished catalyst as a product of the process.

8. The process of claim 7 wherein said metal oxide is admixed with said gel prior to impregnating same with said ammonium molybdate.

9. The process of claim 6 wherein both said metal oxides are admixed with said HF-activated gel.

10. The process of claim 6 wherein said carrier is a moist gel cake formed by reacting water-soluble aluminum salt in aqueous solution with ammonia and removing water from the resulting precipitated gel to provide said moist alumina gel cake.

11. The process of claim 6 wherein said decomposable molybdenum compound is ammonium molybdate.

12. The process of claim 11 wherein said HF-activated carrier is impregnated with ammonium molybdate prior to admixing said metal oxide with said carrier.

13. The process of claim 11 wherein the said HF-activated carrier is impregnated with ammonium molybdate subsequent to admixing said metal oxide with said HF-activated carrier.

14. A reforming catalyst consisting essentially of alumina in a proportion defined hereinafter, from 2–25 weight percent molybdenum oxide, not more than 1 weight percent fluorine, at least one metal oxide selected from the group consisting of titania and iron oxide, each said metal oxide being present in a proportion of from 0.1 to 10 weight percent, and said alumina constituting the remaining proportion, said catalyst being prepared by activating an alumnia with aqueous hydrogen fluoride of such dilution that said alumina can be uniformly contacted therewith, the amount of fluorine in the aqueous hydrogen fluoride being from 0.05 to 1 percent based on the total aluminum content of the alumina, subsequently admixing with the HF-activated alumina at least one metal oxide selected from the group consisting of titania and iron oxide in an amount of from 0.1 to 10 weight percent of each metal oxide, based on the finished catalyst, and also impregnating the HF-activated alumina with a sufficient amount of a solution of a decomposable molybdenum compound to provide said 2–25 weight percent molybdenum oxide in said reforming catalyst.

References Cited in the file of this patent

UNITED STATES PATENTS

| | | |
|---|---|---|
| 2,322,622 | Fischer et al. | June 22, 1943 |
| 2,393,288 | Byrns | Jan. 22, 1946 |
| 2,479,109 | Haensel | Aug. 16, 1949 |
| 2,487,466 | Nahin | Nov. 8, 1949 |
| 2,638,454 | Rowan | May 12, 1953 |